United States Patent [19]

Knoll

[11] Patent Number: 4,731,733

[45] Date of Patent: Mar. 15, 1988

[54] DEVICE FOR POSITIONING SEVERAL UNITS THAT CAN BE MOVED ADJACENT TO AND AT A CONSTANT DISTANCE FROM ONE ANOTHER

[75] Inventor: Heiko Knoll, Oleander, Fed. Rep. of Germany

[73] Assignee: Jagenberg AG, Dusseldorf, Fed. Rep. of Germany

[21] Appl. No.: 825,821

[22] Filed: Feb. 4, 1986

[30] Foreign Application Priority Data

Feb. 6, 1985 [DE] Fed. Rep. of Germany ....... 3504013

[51] Int. Cl.$^4$ ........................ G05B 19/417; B26D 5/30
[52] U.S. Cl. ......................................... 364/167; 83/71; 364/132; 364/475
[58] Field of Search ................................ 364/167–171, 364/474, 475, 468, 469, 478, 131–133; 83/37, 71, 72, 300, 303, 284, 368, 499, 498, 508.3, 348, 399; 318/625

[56] References Cited

U.S. PATENT DOCUMENTS

| | | | |
|---|---|---|---|
| 3,427,518 | 2/1969 | Cloup | 364/475 X |
| 3,488,479 | 1/1970 | Keyes et al. | 83/71 X |
| 3,992,614 | 11/1976 | Buss | 364/475 |
| 4,424,569 | 1/1984 | Imazeki et al. | 318/625 X |
| 4,548,109 | 10/1985 | Tokuno et al. | 83/71 |
| 4,607,552 | 8/1986 | Siler | 83/71 |

*Primary Examiner*—Joseph F. Ruggiero
*Attorney, Agent, or Firm*—Sprung Horn Kramer & Woods

[57] ABSTRACT

A device for positioning several units that can be moved adjacent to and at a constant distance from one another, each unit having a distance-traveled detector associated with its drive mechanism and the device as a whole having central controls that emit a reference value. To provide a positioning device that will operate effectively with a minimum of control lines between each unit and the central controls, each unit has a separate computer to control its drive mechanism, each computer is equipped, as are the central controls, which also have an overall computer, to emit a series of coded blocks of information for each unit, and each of the computers associated with the units is equipped to intercept, process, and forward the blocks of information and to actualize the information pertaining to the position of its own unit.

2 Claims, 1 Drawing Figure

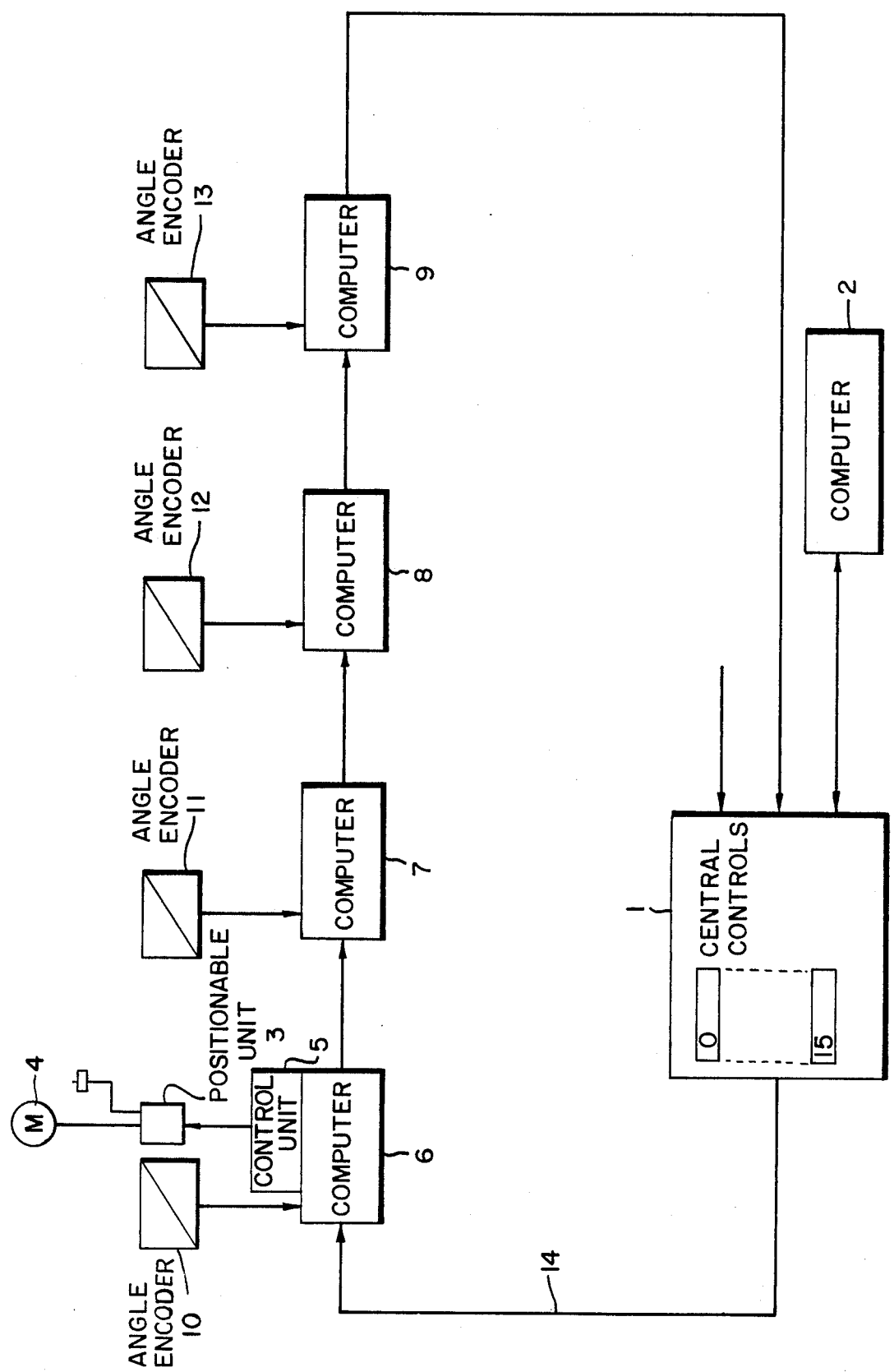

4,731,733

DEVICE FOR POSITIONING SEVERAL UNITS THAT CAN BE MOVED ADJACENT TO AND AT A CONSTANT DISTANCE FROM ONE ANOTHER

BACKGROUND OF THE INVENTION

The present invention relates to a device for positioning several units that can be moved adjacent to and at a constant distance from one another, each unit having a distance-traveled detector associated with its drive mechanism and the device as a whole having central controls that emit a reference value.

Positioning devices of this type are used in conjunction with machines that cut webs of material longitudinally to position units that have circular knives mounted on them. The units in a known positioning device are individually connected to the controls. The distance-traveled detector supplies the controls with the distance actually traveled. A value for that distance is then compared with a reference value representing the prescribed starting position for each unit and, in the event of a deviation, an appropriate readjustment signal is released to the mechanism that drives the unit. The distance-traveled detectors employed in positioning devices of this type supply counting pulses. Since the pulses generated by the pulse generator often get lost on the way to the counter, this method of measuring distance traveled is not especially reliable.

Contemporary angle encoders on the other hand supply absolutely reliable information as to distance covered and instantaneous position. Angle encoders consist of several parallel perforated disks that are driven by the same mechanism that drives the unit but at a different transmission ratio. Digital words that can be unambiguously associated with the positions of the moving units can be constructed from the various perforated disks.

An angle encoder of this type is preferably employed to determine the position of the units in the positioning device in accordance with the invention.

SUMMARY OF THE INVENTION

The object of the present invention is to provide a positioning device of the aforesaid type that will operate effectively with a minimum of control lines between each unit and the central controls.

This object is attained in accordance with the invention in that each unit has a separate computer to control its drive mechanism, in that each computer is equipped, as are the central controls, which also have an overall computer, to emit a series of coded blocks of information for each unit, and in that each of the computers d with the units is equipped to intercept, process, and forward the blocks of information and to actualize the information pertaining to the position of its own unit.

Information flows continually over the ring line in the positioning device in accordance with the invention. The code provides the computer associated with each unit with information as to its own unit and the other units. Actualization of the information as to the position of its own unit makes it possible to determine not only the deviation of that unit from its reference position but also its distance from the adjacent units. The blocks of information associated with each unit comprise all the parameters essential to the units, such as for example, starting position, reference value (which is determined by the angle encoder in its capacity of position generator as a function of the starting position), actual value, etc. Whereas information as to starting position and reference position remains constant while a unit is being moved, the actual position is constantly actualized, making it possible to control the drive mechanism by comparing the reference and actual values.

In one embodiment of the invention, however, the computer associated with each unit can control the speed at which the unit moves as a function of information as to the actual position of that unit and as to the actual positions of the adjacent units. This prevents collisions between adjacent units.

A preferred embodiment of the invention will now be described with reference to the attached drawing, wherein

BRIEF DESCRIPTION OF THE DRAWING

The FIGURE which is a schematic drawing of a positioning device in accordance with the invention.

DETAILED DESCRIPTION OF THE INVENTION

Reference values can be entered in the form of absolute positions 1–15 or in the form of distances between adjacent units into central controls 1 that are provided with a higher-rank computer 2.

The drawing illustrates only one unit 3. It is controlled by a control unit 5 in accordance with signals supplied to the unit 3 which in turn controls its drive mechanism 4.

A computer 6, 7, 8, or 9 and an angle encoder 10, 11, 12, or 13 is associated with each unit 3 (although units 3 and drive mechanism 4 are not illustrated for each computer). Each angle encoder supplies a specific digital word to one of these computers in accordance with the particular position of its associated unit 3. The word must be associated with the instantaneous actual position of a unit 3. This is accomplished by measuring the distance of the individual units from a reference point. The distances are entered once manually into central controls 1, which assign the digital words to them. Given these starting positions, then, the entered reference values are converted into digital words for use by computers 6–9 with angle encoders 10–13. Thus, controls 1 create a coded block of information for each unit. Controls 1 then emit these blocks in series over a ring line 14, in which the computers 6–9 associated with the individual units are interposed. The coding enables computers 6–9 to recognize the blocks and the information contained therein, process the information, and actualize it with respect to each actual position. Since the blocks of information circulate constantly, any incorrect information is immediately corrected during the next passthrough without leading to a malfunction.

Since the position information for all the units is applied over ring line 14 with computers 6–9 connected in series, each computer 6–9 has the position information of the other units available to it. Therefore, each computer 6–9 can control the speed at which its unit moves, as a function of the information available to it as to the actual position of its unit and the actual position of adjacent units. In this way, collisions between adjacent units can be avoided.

It is understood that the specification and examples are illustrative but not limitative of the present invention and that other embodiments within the spirit and scope of the invention will suggest themselves to those skilled in the art.

What is claimed is:

1. In a device for positioning several units which are movable adjacent to and at a constant distance from one another, wherein the device has central controls for producing reference values for starting position of each unit and wherein each unit has a drive mechanism for moving the unit, and a distance-traveled detector associated with the drive mechanism for each unit, the improvement wherein: the controls include a main computer for producing a series of coded blocks of information for each unit relating to its starting position and each unit has a separate computer for controlling its drive mechanism, wherein the separate computers and the central controls are connected in series and the separate computers intercept, process, and forward the blocks of information along the serial connection to actualize the information pertaining to the position of its own unit.

2. The positioning device as in claim 1, wherein the separate computer associated with each unit controls the speed at which the unit moves as a function of information as to the actual position of that unit and as to the actual positions of adjacent units.

* * * * *